(12) United States Patent
Patel et al.

(10) Patent No.: US 10,877,191 B2
(45) Date of Patent: Dec. 29, 2020

(54) BARRIER ELEMENTS ON A MICROSTRUCTURED ARTICLE HAVING ADHESIVE SEALING LAYER AND SPECIFIED MODULUS OF ELASTICITY

(71) Applicant: 3M INNOVATIVE PROPERTIES COMPANY, St. Paul, MN (US)

(72) Inventors: Suman K. Patel, Woodbury, MN (US); John P. Baetzold, North Saint Paul, MN (US); Erik A. Aho, New Richmond, WI (US); Manoj Nirmal, Saint Paul, MN (US); Mikhail L. Pekurovsky, Bloomington, MN (US); Scott M. Tapio, Falcon Heights, MN (US); Denis Terzic, Minnetonka, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 182 days.

(21) Appl. No.: 15/740,933

(22) PCT Filed: Jun. 29, 2016

(86) PCT No.: PCT/US2016/040168
§ 371 (c)(1),
(2) Date: Dec. 29, 2017

(87) PCT Pub. No.: WO2017/004247
PCT Pub. Date: Jan. 5, 2017

(65) Prior Publication Data
US 2018/0188424 A1    Jul. 5, 2018

Related U.S. Application Data

(60) Provisional application No. 62/186,954, filed on Jun. 30, 2015.

(51) Int. Cl.
*G02B 5/124* (2006.01)
*C09J 7/24* (2018.01)
(Continued)

(52) U.S. Cl.
CPC ............... *G02B 5/124* (2013.01); *B32B 3/30* (2013.01); *B32B 7/00* (2013.01); *B32B 7/12* (2013.01);
(Continued)

(58) Field of Classification Search
CPC ............... E04D 13/033; E06B 3/6715; E06B 2009/2417; F21S 11/00; F21S 11/002; F21S 11/007; G02B 5/12–136
(Continued)

(56) References Cited

U.S. PATENT DOCUMENTS

| 4,478,769 A | 10/1984 | Pricone |
| 4,576,850 A | 3/1986 | Martens |

(Continued)

FOREIGN PATENT DOCUMENTS

| JP | 2001-194504 | 7/2001 |
| JP | 2004-83647 | 3/2004 |

(Continued)

OTHER PUBLICATIONS

International Search Report for PCT International Application No. PCT/US2016/040168, dated Oct. 6, 2016, 5 pages.

*Primary Examiner* — Ryan S Dunning
(74) *Attorney, Agent, or Firm* — Carlos M. Téllez Rodriguez; 3M Innovative Properties Company

(57) ABSTRACT

The disclosed light directing article comprises a structured layer, an adhesive sealing layer, and barrier elements. The structured layer comprises multiple microstructured elements that are opposite a major surface. The adhesive sealing layer has a first region and a second region. The (Continued)

second region is in contact with the structured layer. The barrier element are at the first region. The first region with the barrier element and second region have sufficiently different properties to form a low refractive index layer between the adhesive sealing layer and the structured layer. The barrier element comprises a crosslinked polymeric matrix having a modulus of elasticity less than 4.4 GPa.

16 Claims, 2 Drawing Sheets

(51) Int. Cl.
| | | |
|---|---|---|
| | *C09J 7/38* | (2018.01) |
| | *B32B 7/00* | (2019.01) |
| | *B32B 23/20* | (2006.01) |
| | *B32B 3/30* | (2006.01) |
| | *B32B 27/28* | (2006.01) |
| | *B32B 27/30* | (2006.01) |
| | *B32B 27/32* | (2006.01) |
| | *B32B 27/36* | (2006.01) |
| | *B32B 27/42* | (2006.01) |
| | *B32B 27/34* | (2006.01) |
| | *B32B 23/08* | (2006.01) |
| | *B32B 27/08* | (2006.01) |
| | *B32B 27/40* | (2006.01) |
| | *B32B 27/10* | (2006.01) |
| | *B32B 7/12* | (2006.01) |

(52) U.S. Cl.
CPC .............. *B32B 23/08* (2013.01); *B32B 23/20* (2013.01); *B32B 27/08* (2013.01); *B32B 27/10* (2013.01); *B32B 27/28* (2013.01); *B32B 27/281* (2013.01); *B32B 27/302* (2013.01); *B32B 27/304* (2013.01); *B32B 27/306* (2013.01); *B32B 27/308* (2013.01); *B32B 27/32* (2013.01); *B32B 27/322* (2013.01); *B32B 27/325* (2013.01); *B32B 27/34* (2013.01); *B32B 27/36* (2013.01); *B32B 27/365* (2013.01); *B32B 27/40* (2013.01); *B32B 27/42* (2013.01); *C09J 7/24* (2018.01); *C09J 7/38* (2018.01); *B32B 2250/03* (2013.01); *B32B 2255/10* (2013.01); *B32B 2255/26* (2013.01); *B32B 2307/40* (2013.01); *B32B 2307/41* (2013.01); *B32B 2307/412* (2013.01); *B32B 2307/416* (2013.01); *B32B 2307/418* (2013.01); *B32B 2437/00* (2013.01); *B32B 2451/00* (2013.01); *B32B 2590/00* (2013.01); *B32B 2605/00* (2013.01); *C09J 2301/302* (2020.08); *C09J 2433/001* (2013.01)

(58) Field of Classification Search
USPC ................................................... 359/591–598
See application file for complete search history.

(56) References Cited

U.S. PATENT DOCUMENTS

| | | | |
|---|---|---|---|
| 4,775,219 A | 10/1988 | Appeldorn | |
| 5,156,863 A | 10/1992 | Pricone | |
| 5,450,235 A | 9/1995 | Smith | |
| 5,743,891 A | 4/1998 | Tolkoff | |
| 5,804,610 A | 9/1998 | Hamer | |
| 7,410,604 B2 | 8/2008 | Erickson | |
| 7,422,334 B2 | 9/2008 | Smith | |
| 7,611,251 B2 | 11/2009 | Thakkar | |
| 8,371,703 B2 | 2/2013 | Smith | |
| 8,526,084 B2 | 9/2013 | Weyermann | |
| 2004/0048073 A1* | 3/2004 | Bacon, Jr. ................ | B41M 5/52 428/423.1 |
| 2006/0003178 A1 | 1/2006 | Strobel | |
| 2007/0242356 A1 | 10/2007 | Thakkar | |
| 2008/0185091 A1* | 8/2008 | Sudo ..................... | B32B 37/003 156/201 |
| 2009/0021831 A1* | 1/2009 | Bacon, Jr. .............. | G02B 5/124 359/530 |
| 2009/0030104 A1 | 1/2009 | Makino | |
| 2012/0038984 A1 | 2/2012 | Patel | |
| 2013/0034682 A1 | 2/2013 | Free | |
| 2013/0114143 A1* | 5/2013 | Thakkar ................. | G02B 5/124 359/530 |
| 2013/0135731 A1 | 5/2013 | Smith | |
| 2017/0008255 A1* | 1/2017 | Shin ....................... | B32B 15/08 |

FOREIGN PATENT DOCUMENTS

| | | |
|---|---|---|
| JP | 2005-523467 | 8/2005 |
| JP | 2013-018910 | 1/2013 |
| WO | WO 03/089963 | 10/2003 |
| WO | WO 2006/041089 | 4/2006 |
| WO | WO 2011-129832 | 10/2011 |
| WO | WO 2011-152977 | 12/2011 |
| WO | WO 2013-043827 | 3/2013 |
| WO | WO 2015/026581 | 2/2015 |
| WO | WO 2016-064669 | 4/2016 |

* cited by examiner

BARRIER ELEMENTS ON A MICROSTRUCTURED ARTICLE HAVING ADHESIVE SEALING LAYER AND SPECIFIED MODULUS OF ELASTICITY

CROSS REFERENCE TO RELATED APPLICATIONS

This application is a national stage filing under 35 U.S.C. 371 of PCT/US2016/040168, filed Jun. 29, 2016, which claims the benefit of Provisional Application No. 62/186,954, filed Jun. 30, 2015, the disclosures of which are incorporated by reference in their entirety herein.

FIELD

The present disclosure relates to a barrier element on a light directing article that comprises microstructured elements.

BACKGROUND

Light directing articles have an ability to manipulate incoming light. Light directing films and sheeting typically include an optically active portion that may be microstructured elements or beads.

Light directing articles may allow portions of light to pass through the substrate in a controlled manner, such as light redirecting films. In these types of light directing articles, the microstructured elements typically are microstructured prisms. Alternatively, the light directing articles may not be transmissive to light and instead reflect all incident light. Throughout this disclosure the terms light directing articles and light redirecting articles are used interchangeably.

Daylight redirecting films (DRFs) provide natural lighting by redirecting incoming sunlight upward, onto the ceiling. This can lead to significant energy savings by reducing the need for artificial lights. Light Redirection Films can consist of linear optical microstructures that reflect incoming sunlight that would normally land on the floor onto the ceiling. DRFs are typically installed on the upper clerestory section of windows 7' and above.

In general, microstructured light redirecting films may be fragile under certain circumstances because the microstructured features may be subject to mechanical damage and/or chemical damage (e.g., window cleaners). One challenge when attempting to protect the microstructured elements in a DRF is that the lamination process to add a cover or protective layer can cause damage to those microstructured elements. The same challenge is present when attempting to laminate any other type of functional layer or film, such as a diffuser, to a DRF on the side of the microstructured elements. Additionally, the presence of an additional layer next to the DRF may also modify its optical properties and significantly decrease or nullify its light redirecting properties.

Other embodiments of light directing articles may redirect incident light towards its originating source, and are referred to as retroreflective articles. The ability to retroreflect light has led to the wide-spread use of retroreflective sheetings on a variety of articles. For retroreflective articles, the microstructured element typically is a microstructured prism that is a cube-corner. U.S. Pat. No. 5,450,235 shows an example of a cube-corner retroreflective sheeting.

Typically, a cube corner element includes three mutually perpendicular optical faces that intersect at a single apex. Generally, light that is incident on a corner cube element from a light source is totally internally reflected from each of the three perpendicular cube corner optical faces and is redirected back toward the light source. Presence of, for example, dirt, water, and adhesive on the optical faces can prevent total internal reflection (TIR) and lead to a reduction in the retroreflected light intensity. As such, the air interface is typically protected by a sealing film. However, sealing films may reduce the total active area, which is the area over which retroreflection can occur. Further, sealing films increase the manufacturing cost. Additionally, the sealing process can create a visible pattern in the retroreflective sheeting that is undesirable for many applications, such as, for example, use in a license plate and/or in commercial graphics applications where a more uniform appearance is generally preferred. Metalized cube corners do not rely on TIR for retroreflective light, but they are typically not white enough for daytime viewing of, for example, signing applications. Furthermore, the durability of the metal coatings may be inadequate.

SUMMARY

The disclosed light directing article comprises a structured layer, an adhesive sealing layer, and barrier elements. The structured layer comprises multiple microstructured elements that are opposite a major surface. The adhesive sealing layer has a first region and a second region. The second region is in contact with the structured layer. The barrier element are at the first region. The first region with the barrier element and second region have sufficiently different properties to form a low refractive index layer between the adhesive sealing layer and the structured layer. In certain embodiments, the barrier element comprises a crosslinked polymeric matrix having a modulus of elasticity less than 4.8 GPa. In other embodiments, the barrier element comprises a crosslinked polymeric matrix having a modulus of elasticity greater than 0.5 GPa, and in one embodiment greater than 0.75 GPa, and in one embodiment greater than 0.9 GPa.

"Microstructure" as used herein is defined and explained in U.S. Pat. No. 4,576,850, the disclosure of which is herein incorporated by reference. Microstructures are generally discontinuities such as projections and indentations in the surface of an article that deviate in profile from an average center line drawn through the microstructure such that the sum of the areas embraced by the surface profile above the center line is equal to the sum of the areas below the line, the line being essentially parallel to the nominal surface (bearing the microstructure) of the article. The heights of the deviations will typically be about +/−0.005 to +/−750 microns, as measured by an optical or electron microscope, through a representative characteristic length of the surface, e.g., 1-30 cm. The average center line can be plano, concave, convex, aspheric or combinations thereof. Articles where the deviations are of low order, e.g., from +/−0.005 +/−0.1 or, preferably, +/−0.05 microns, and the deviations are of infrequent or minimal occurrence, i.e., the surface is free of any significant discontinuities, can be considered to have an essentially "flat" or "smooth" surface. Other articles have deviations are of high-order, e.g., from +/−0.1 to +/−750 microns, and attributable to microstructure comprising a plurality of utilitarian discontinuities which are the same or different and spaced apart or contiguous in a random or ordered manner.

The term "adhesive" as used herein refers to polymeric compositions useful to adhere together two components (adherents).

The term "adjacent" as used herein refers to the relative position of two elements, such as layers in a film construction, that are close to each other and may or may not be necessarily in contact with each other and may have one or more layers separating the two elements, as understood by the context in which "adjacent" appears.

The term "immediately adjacent" as used herein refers to the relative position of two elements, such as layers in a film construction, that are immediately next to each other without having any other layers separating the two elements, as understood by the context in which "immediately adjacent" appears.

The term "film" as used herein refers, depending on the context, to either a single layer article or to a multilayer construction, where the different layers may have been laminated, extruded, coated, or any combination thereof.

The term "barrier elements" as used herein refers to physical features laid on top of regions of an adhesive layer that help maintain the optical performance of the light directing article when the adhesive layer and structured layer are bonded to each other in opposing fashion. The barrier elements prevent the adhesive layer from filling and/or contacting the space surrounding microstructured elements.

The term "random" as used herein refers to features that appear not to be periodic or semi-periodic along one or two different directions in reference to the article. Those features may still be periodic but with a period sufficiently larger than the mean pitch of individual features so that the period is not noticeable to most viewers.

As used herein, the term "sealing" or "sealed" when referring to an edge of an article of this disclosure means blocking the ingress of certain undesired elements such as moisture or other contaminants.

The term "visible light" as used herein refers to refers to radiation in the visible spectrum, which in this disclosure is taken to be from 400 nm to 700 nm.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

When a seal film is used for light directing articles, an additional adhesive is often needed on the seal film to secure the entire light directing article to a substrate. It is possible to use an adhesive sealing layer to function as both the seal film and to provide an adhesive surface to secure the light directing article to a substrate. (See for example, U.S. Patent Application Publications 2013-0034682 and 2013-0135731, the disclosures of which are herein incorporated by reference).

Figure 1A:
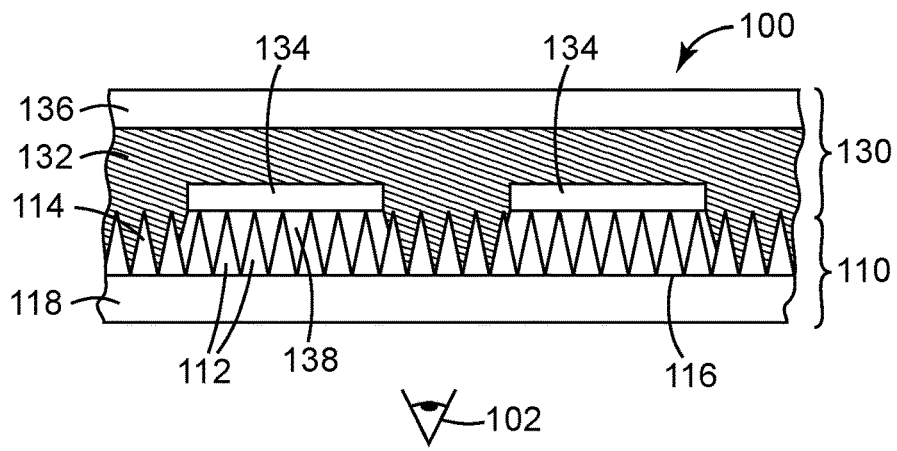
FIGS. 1A and 1B are schematic side views of one exemplary embodiment of a light directing article of the present disclosure.
Figure 1B:
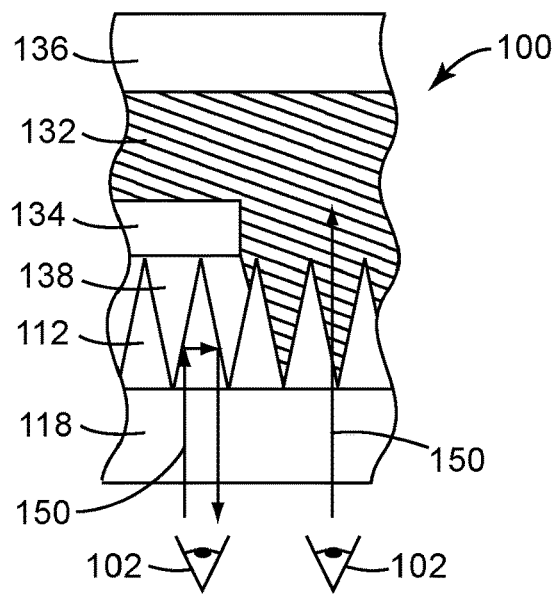
Figure 2:
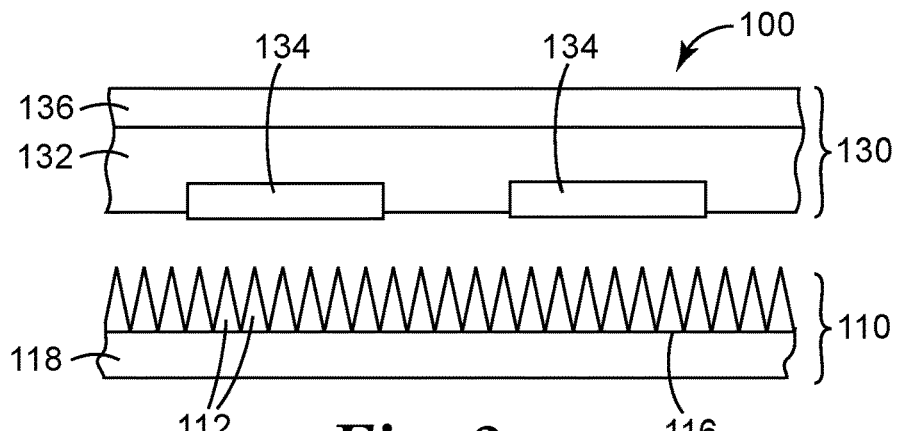
FIG. 2 is schematic drawing of one exemplary intermediary step in forming the light directing article of FIG. 1.
Figure 3:
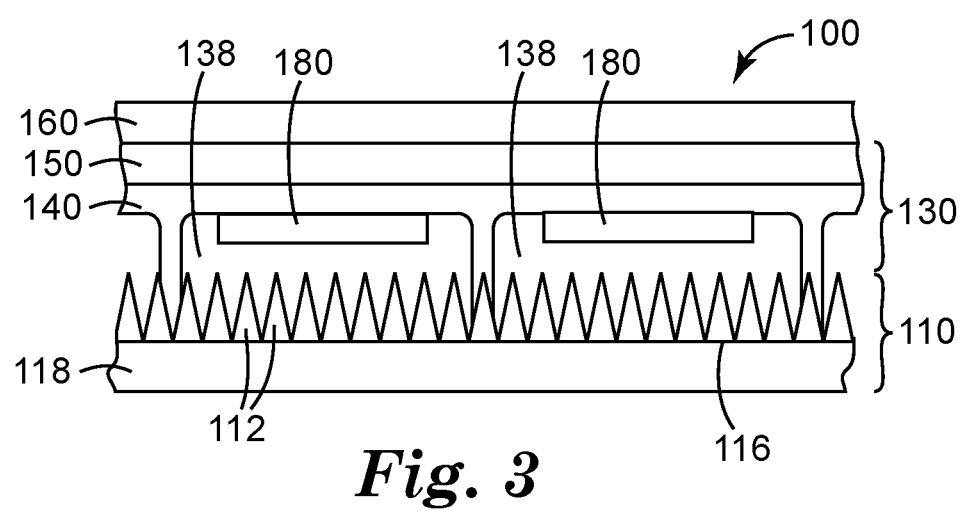
FIG. 3 is a schematic drawing of one exemplary embodiment of a light directing article of the present disclosure.

FIGS. 1A and 1B are schematic side views of one exemplary embodiment of a light directing article 100 of the present disclosure, where the adhesive sealing layer 130 is a pressure sensitive adhesive. FIG. 2 is schematic drawing of one exemplary intermediary step in forming the light directing article 100 of FIG. 1. FIG. 3 is a schematic drawing of one exemplary embodiment of a light directing article 100 of the present disclosure where the adhesive sealing layer 130 is a structured adhesive. Detailed descriptions of these constructions will be provided below. Similar element in each of the figures is marked with similar reference numbers. In some embodiments, the adhesive is not a hot-melt (i.e., heat-activated) adhesive.

The disclosed light directing article 100 comprises a structured layer 110 and an adhesive sealing layer 130. The structured layer 110 comprises multiple microstructured elements 112 that are opposite a major surface 116 of the structured layer 110. The surface containing the microstructured elements 112 can be referred to as a structured surface 114 of the structured layer 110. The adhesive sealing layer 130 has a first region and a second region wherein the second region is in contact with the structured layer 110. A barrier element 134 is provided at the first region of the adhesive sealing layer 130. The first region with the barrier element and second region have sufficiently different properties to form a low refractive index layer between the adhesive sealing layer 130 and the structured layer 110. In some embodiments, the barrier element comprises a crosslinked polymeric matrix having a modulus of elasticity less than 4.8 Gpa. In some embodiments, the barrier element comprises a crosslinked polymeric matrix having a modulus of elasticity less than 4.4 Gpa. In other embodiments, the barrier element comprises a crosslinked polymeric matrix has a modulus of elasticity of at least 0.5. In one embodiment, the barrier element comprises a crosslinked polymeric matrix has a modulus of elasticity of at least 0.75. In one embodiment, the barrier element comprises a crosslinked polymeric matrix has a modulus of elasticity of at least 0.9.

In one embodiment crosslinked polymeric matrix has a hardness less than 370 MPa. In one embodiment, the crosslinked polymeric matrix has a hardness that is greater than 5 MPa.

The presence of the adhesive contacting the microstructured elements substantially destroys the ability to direct light. Thus, to maximize the light management through the microstructured element, it is desired that the portions of the microstructured elements in contact with the barrier elements not be in contact with the adhesive or penetrate into the barrier element. The barrier element forms a physical "barrier" between the adhesive of the adhesive sealing layer and the microstructured element. Barrier element has sufficient structural integrity to prevent the adhesive sealing layer from flowing into a low refractive index layer that is between structured surface and barrier layer. Barrier layer can directly contact or be spaced apart from or can push slightly into the tips of microstructured elements.

It is important too that the microstructured element does not make intimate contact with the adhesive of the adhesive sealing layer in areas where the barrier elements are present or that the microstructured element does not penetrate into the barrier element because then that microstructured element's ability to manage the incoming light is lost or minimized at that portion of the microstructured element that has penetrated into the adhesive or the barrier element. For example, if the light directing article is a retroreflective article, the cube-corner's ability to retroreflect the incident light is lost in the portion of the cube-corner prism that has penetrated into the barrier element.

It was originally believed that a highly crosslinked and extremely rigid barrier element would be ideal for maximizing the light management abilities of the microstructured elements adjacent to the barrier elements because the microstructured element would not be able to penetrate into the barrier element. However, surprisingly, highly crosslinked and extremely rigid barrier element can crack and break under pressure, stress, or flexing. Once cracked, the effectiveness of the barrier element is reduced.

It was found that crosslinked barrier element 134 that exhibits a modulus of elasticity less than 4.8 Gpa was greatly improved over barrier elements 134 having a modulus of elasticity 4.8 or greater (i.e., a barrier element that is very rigid and hard). A barrier element 134 having a modulus of elasticity greater than 0.5, and greater than 0.9 exhibits enough flexibility to resist cracking and breaking, but not so much flexibility that the microstructured element is able to penetrate into the barrier element 134 and compromise its light managing abilities.

The barrier elements 134 should be sufficiently thick to prevent the microstructured element 112 from breaking through into the adhesive sealing layer 130. In one embodiment, the crosslinked polymeric matrix of the barrier element 134 is at least 1.6 microns thick. In one embodiment, the barrier element 134 is at least 1.75 microns thick. In one embodiment, the barrier element 134 is at least 2.0 microns thick. In one embodiment, the barrier element 134 is at least 3.0 microns thick. In other embodiments, the barrier element 134 is at least 3 microns thick. In other embodiments, the barrier element 134 is at least 5 microns thick. In other embodiments, the barrier element 134 is at least 7 microns thick. In other embodiments, the barrier element 134 is at least 10 microns thick.

In other embodiments, the barrier element 134 has a thickness from 1.6 microns to 10 microns. In other embodiments, the barrier element 134 has a thickness from 1.6 microns to 7 microns. In other embodiments, the barrier element 134 has a thickness from 1.6 microns to 5 microns. In other embodiments, the barrier element 134 has a thickness from 1.6 microns to 3 microns. In other embodiments, the barrier element 134 has a thickness from 1.6 microns to 2 microns.

In other embodiments, the barrier element 134 has a thickness from 1.75 microns to 10 microns. In other embodiments, the barrier element 134 has a thickness from 1.75 microns to 7 microns. In other embodiments, the barrier element 134 has a thickness from 1.75 microns to 5 microns. In other embodiments, the barrier element 134 has a thickness from 1.75 microns to 3 microns. In other embodiments, the barrier element 134 has a thickness from 1.75 microns to 2 microns.

In other embodiments, the barrier element 134 has a thickness from 2 microns to 10 microns. In other embodiments, the barrier element 134 has a thickness from 2 microns to 7 microns. In other embodiments, the barrier element 134 has a thickness from 2 microns to 5 microns. In other embodiments, the barrier element 134 has a thickness from 2 microns to 3 microns.

In other embodiments, the barrier element 134 has a thickness from 3 microns to 10 microns. In other embodiments, the barrier element 134 has a thickness from 3 microns to 7 microns. In other embodiments, the barrier element 134 has a thickness from 3 microns to 5 microns.

The disclosed barrier element prevents wetting of microstructured element 112 by the pressure sensitive and prevents the microstructured elements 112 from penetrating into the barrier element 134, for example, either initially during fabrication of the light directing article, during fabrication when the material is stacked, handled, or laminated, or over time due pressure and flexing of to the viscoelastic nature of the adhesive. A trapped layer between pressure sensitive adhesive 130 and microstructured elements 112 creates low refractive index layer 138. Other materials such as aerogel or other low refractive index materials may be used in place of or in combination with air. The presence of the barrier element 134 permits the portions of structured surface 114 adjacent to low refractive index layer 138 and/or barrier element 134 to direct or retroreflect incident light 150. Barrier layers 134 may also prevent pressure sensitive adhesive 130 from wetting out the cube sheeting. Pressure sensitive adhesive 130 that is not in contact with a barrier layer 134 adheres to the microstructured elements, thereby effectively sealing the areas to form optically active areas or cells. In some embodiments, pressure sensitive adhesive 130 also holds the entire construction together, thereby eliminating the need for a separate sealing film and sealing process. In some embodiments, the pressure sensitive adhesive is in intimate contact with or is directly adjacent to the structured surface or the cube corner elements.

In general, any material that prevents the pressure sensitive adhesive from contacting microstructured elements 112 or flowing or creeping into low refractive index layer 138 can be used in barrier element 134. Exemplary materials for use in barrier element 134 include resins, polymeric materials, dyes, inks, vinyl, inorganic materials, radiation-curable polymers (for example, UV curable or e-beam curable), pigment. In one embodiment, exemplary materials used to form the barrier elements include crosslinkable acrylates. In one embodiment, exemplary materials used to form the barrier elements include crosslinkable urethane acrylates, acrylic acrylates, polyester acrylates. In one embodiment, exemplary materials used to form the barrier elements include crosslinkable molecule with at least 2 acrylate groups.

In one embodiment, the composition further comprises a diluent to control viscosity of the composition. In one embodiment, the diluent has a viscosity of less than 200 cPS. In one embodiment, the diluent has a viscosity of less than 10 cPS. In one embodiment, the diluent has a viscosity of less than 50 cPS and greater than 3 cPS.

In one embodiment, the composition for forming the barrier elements 134 has a viscosity of 2500 cPS or less. In one embodiment, the composition for forming the barrier islands 134 has a viscosity of 2000 cPS or less. In one embodiment, the composition for forming the barrier elements 134 has a viscosity of 1500 cPS or less. In one embodiment, the composition for forming the barrier elements 134 has a viscosity of 1000 cPS or less. In one embodiment, the composition for forming the barrier elements 134 has a viscosity of 100 cPS or greater. In one embodiment, the composition for forming the barrier elements 134 has a viscosity of 300 cPS or greater. In one embodiment, the composition for forming the barrier elements 134 has a viscosity of 400 cPS or greater. In other embodiments, the composition for forming the barrier elements 134 has a viscosity of 500 cPS or greater. In other embodiments, the composition for forming the barrier elements 134 has a viscosity of 800 cPS or greater. In other embodiments, the composition for forming the barrier elements 134 has a viscosity of 1000 cPS or greater.

In other embodiments, the composition for forming the barrier elements 134 has a viscosity from 100 cPS to 2500 cPS. In other embodiments, the composition for forming the barrier elements 134 has a viscosity from 100 cPS to 2000 cPS. In other embodiments, the composition for forming the barrier elements 134 has a viscosity from 300 cPS to 2000 cPS. In other embodiments, the composition for forming the barrier elements 134 has a viscosity from 400 cPS to 2000 cPS. In other embodiments, the composition for forming the barrier elements 134 has a viscosity from 400 cPS to 1000 cPS. In other embodiments, the composition for forming the barrier elements 134 has a viscosity from 500 cPS to 2500 cPS. In other embodiments, the composition for forming the barrier elements 134 has a viscosity from 500 cPS to 2000 cPS. In other embodiments, the composition for forming the barrier elements 134 has a viscosity from 800 cPS to 1500 cPS. In other embodiments, the composition for forming the barrier elements 134 has a viscosity from 1000 cPS to 1300 cPS.

In one embodiment, the composition for forming the barrier islands 134 further comprises a photoinitiator. In one embodiment, the photoinitiator is present in at least 0.5% and less than 2.0 wt. % of the total composition for forming the barrier islands 134.

In one embodiment the composition for forming the barrier islands 134 further comprises a solvent that is ideally non-reactive and less than 10% wt. of the total composition for forming the barrier islands 134.

FIGS. 1A and 1B show one exemplary embodiment of a light directing article 100. Light directing article 100 includes a structured layer 110 including microstructured elements 112 that collectively form a structured surface 114 opposite a major surface 116. Structured layer 110 also includes an optional overlay layer 118. An adhesive sealing layer 130 is adjacent to structured layer 110, and specifically is adjacent to the microstructured elements 112 at the structured surface 114. Adhesive sealing layer 130 includes one or more barrier elements 134. In the embodiment shown in FIGS. 1A and 1B, the viewer 102 observes retroreflected light 150 from a microstructured element 112 that is a cube corner. It is understood that this basic construction for a light directing article 100 could be used when the microstructured element 112 is a prism that instead of retroreflects light the prism redirects the path of the light that enters the prism and leaves through the barrier element 134 and adhesive sealing layer 130.

As is shown in FIG. 1B, a light ray 150 incident on a cube corner element 112 that is adjacent to low refractive index layer 138 is retroreflected back to viewer 102. For this reason, a first region of light directing article 100 that includes low refractive index layer 138 is referred to as an optically active area. In contrast, a second region does not include the low refractive index layer 138 where the adhesive sealing layer 130 is in contact with the structured surface 114 of the structured layer 110. For a retroreflective article, at the second region incident light is not retroreflected and is referred to as an optically inactive area. For light directing articles that control the direction of light passing through the light directing article, at the second region the prisms do not direct light out in the predetermined fashion as is accomplished in the first region and is referred to as an optically inactive area.

Low refractive index layer 138 includes a material that has a refractive index that is less than the refractive index of the structured layer. In one embodiment, the low refractive index layer 138 has a refractive index that is about 1.30, less than about 1.25, less than about 1.2, less than about 1.15, less than about 1.10, or less than about 1.05. Exemplary low refractive index materials include air and low index mate-rials are described in U.S. Patent Application Publication 2012/0038984, which is hereby incorporated herein by reference.

In at least some embodiments, the adhesive layer includes a first region and a second region. The second region is in direct or intimate contact with the structured surface. In some embodiments, the first and second regions have sufficiently different properties to form and separate the low refractive index layer between and from the pressure sensitive adhesive layer and the structured surface. In other embodiments, the first and second regions have similar and/or identical properties as they are part of the same adhesive layer. In some embodiments, the second region includes a pressure sensitive adhesive and the first region differs in composition from the second region. In some embodiments, the first region and the second region have different polymer morphology. In some embodiments, the first region and the second region have different flow properties. In some embodiments, the first region and the second region have different viscoelastic properties. In some embodiments, the first region and the second region have different adhesive properties. In some embodiments, the retroreflective article includes a plurality of second regions that form a pattern. In some embodiments, the pattern is one of an irregular pattern, a regular pattern, a grid, words, graphics, and lines.

Exemplary pressure sensitive adhesives for use in the adhesive sealing include crosslinked tackified acrylic pressure-sensitive adhesives. Other pressure sensitive adhesives such as blends of natural or synthetic rubber and resin, silicone or other polymer systems, with or without additives can be used. The PSTC (pressure sensitive tape council) definition of a pressure sensitive adhesive is an adhesive that is permanently tacky at room temperature which adheres to a variety of surfaces with light pressure (finger pressure) with no phase change (liquid to solid).

Acrylic Acid and Meth(acrylic) Acid Esters: The acrylic esters are present at ranges of from about 65 to about 99 parts by weight, preferably about 78 to about 98 parts by weight, and more preferably about 90 to about 98 parts by weight. Useful acrylic esters include at least one monomer selected from the group consisting of a first monofunctional acrylate or methacrylate ester of a non-tertiary alkyl alcohol, the alkyl group of which comprises from 4 to about 12 carbon atoms, and mixtures thereof. Such acrylates or methacrylate esters generally have, as homopolymers, glass transition temperatures below about −25° C. A higher amount of this monomer relative to the other comonomers affords the PSA higher tack at low temperatures.

Acrylate or methacrylate ester monomers include, but are not limited to, those selected from the group consisting of n-butyl acrylate (BA), n-butyl methacrylate, isobutyl acrylate, 2-methyl butyl acrylate, 2-ethylhexyl acrylate, n-octyl acrylate, isooctyl acrylate (IOA), isooctyl methacrylate, isononyl acrylate, isodecyl acrylate, and mixtures thereof.

Acrylates include those selected from the group consisting of isooctyl acrylate, n-butyl acrylate, 2-methyl butyl acrylate, 2-ethylhexyl acrylate, and mixtures thereof.

Polar Monomers: Low levels of (typically about 1 to about 10 parts by weight) of a polar monomer such as a carboxylic acid can be used to increase the cohesive strength of the pressure-sensitive adhesive. At higher levels, these polar monomers tend to diminish tack, increase glass transition temperature and decrease low temperature performance.

Useful copolymerizable acidic monomers include, but are not limited to, those selected from the group consisting of ethylenically unsaturated carboxylic acids, ethylenically unsaturated sulfonic acids, and ethylenically unsaturated phosphonic acids. Examples of such monomers include those selected from the group consisting of acrylic acid (AA), methacrylic acid, itaconic acid, fumaric acid, crotonic acid, citraconic acid, maleic acid, .beta.-carboxyethyl acrylate, sulfoethyl methacrylate, and the like, and mixtures thereof.

Other useful copolymerizable monomers include, but are not limited to, (meth)acrylamides, N,N-dialkyl substituted (meth)acrylamides, N-vinyl lactams, and N,N-dialkylaminoalkyl (meth)acrylates. Illustrative examples include, but are not limited to, those selected from the group consisting of N,N-dimethyl acrylamide, N,N-dimethyl methacrylamide, N,N-diethyl acrylamide, N,N-diethyl methacrylamide, N,N-dimethylaminoethyl methacrylate, N,N-dimethylaminopropyl methacrylate, N,N-dimethylaminoethyl acrylate, N,N-dimethylaminopropyl acrylate, N-vinyl pyrrolidone, N-vinyl caprolactam, and the like, and mixtures thereof.

Non-polar Ethylenically Unsaturated Monomers: The non-polar ethylenically unsaturated monomer is a monomer whose homopolymer has a solubility parameter as measured by the Fedors method (see Polymer Handbook, Bandrup and Immergut) of not greater than 10.50 and a Tg greater than 15° C. The non-polar nature of this monomer tends to improve the low energy surface adhesion of the adhesive. These non-polar ethylenically unsaturated monomers are selected from the group consisting of alkyl (meth)acrylates, N-alkyl (meth)acrylamides, and combinations thereof. Illustrative examples include, but are not limited to, 3,3,5-trimethylcyclohexyl acrylate, 3,3,5-trimethylcyclohexyl methacrylate, cyclohexyl acrylate, cyclohexyl methacrylate, isobornyl acrylate, isobornyl methacrylate, N-octyl acrylamide, N-octyl methacrylamide or combinations thereof. Optionally, from 0 to 25 parts by weight of a non-polar ethylenically unsaturated monomer may be added.

Tackifiers: tackifiers include terpene phenolics, rosins, rosin esters, esters of hydrogenated rosins, synthetic hydrocarbon resins and combinations thereof. These provide good bonding characteristics on low energy surfaces. Hydrogenated rosin esters and hydrogenated C9 aromatic resins are the most preferred tackifiers because of performance advantages that include high levels of "tack", outdoor durability, oxidation resistance, and limited interference in post crosslinking of acrylic PSAs.

Tackifiers may be added at a level of about 1 to about 65 parts per 100 parts of the monofunctional acrylate or methacrylate ester of a non-tertiary alkyl alcohol, the polar monomer, and the nonpolar ethylenically unsaturated monomer to achieve desired "tack". Preferably, the tackifier has a softening point of about 65 to about 100 degrees C. However, the addition of tackifiers can reduce shear or cohesive strength and raise the Tg of the acrylic PSA, which is undesirable for cold temperature performance.

Crosslinkers: In order to increase the shear or cohesive strength of acrylic pressure-sensitive adhesives, a crosslinking additive is usually incorporated into the PSA. Two main types of crosslinking additives are commonly used. The first crosslinking additive is a thermal crosslinking additive such as a multifunctional aziridine. One example is 1,1'-(1,3-phenylene dicarbonyl)-bis-(2-methylaziridine) (CAS No. 7652-64-4), referred to herein as "bisamide". Such chemical crosslinkers can be added into solvent-based PSAs after polymerization and activated by heat during oven drying of the coated adhesive.

In another embodiment, chemical crosslinkers that rely upon free radicals to carry out the crosslinking reaction may be employed. Reagents such as, for example, peroxides serve as a source of free radicals. When heated sufficiently, these precursors will generate free radicals, which bring about a crosslinking reaction of the polymer. A common free radical generating reagent is benzoyl peroxide. Free radical generators are required only in small quantities, but generally require higher temperatures to complete the crosslinking reaction than those required for the bisamide reagent.

The second type of chemical crosslinker is a photosensitive crosslinker that is activated by high intensity ultraviolet (UV) light. Two common photosensitive crosslinkers used for hot melt acrylic PSAs are benzophenone and 4-acryloxybenzophenone, which can be copolymerized into the PSA polymer. Another photocrosslinker, which can be post-added to the solution polymer and activated by UV light is a triazine; for example 2,4-bis(trichloromethyl)-6-(4-methoxy-phenyl)-s-triazine. These crosslinkers are activated by UV light generated from artificial sources such as medium pressure mercury lamps or a UV blacklight.

Hydrolyzable, free-radically copolymerizable crosslinkers, such as monoethylenically unsaturated mono-, di- and trialkoxy silane compounds including, but not limited to, methacryloxypropyltrimethoxysilane (SILANE™ A-174 available from Union Carbide Chemicals and Plastics Co.), vinyldimethylethoxysilane, vinylmethyldiethoxysilane, vinyltriethoxysilane, vinyltrimethoxysilane, vinyltriphenoxysilane, and the like are also useful crosslinking agents.

Crosslinker is typically present from 0 to about 1 part by weight based on 100 parts by weight of acrylic acid or meth(acrylic) acid esters, polar monomers, and non-polar ethylenically unsaturated monomers.

Aside from thermal, moisture, or photosensitive crosslinkers, crosslinking may also be achieved using high-energy electromagnetic radiation such as gamma or e-beam radiation. In this case, no crosslinker may be required.

Other Additives: Because acrylic pressure-sensitive adhesives have excellent oxidative stability, additives such as antioxidant and UV light absorbers are generally not needed. Small amounts of heat stabilizer can be utilized in hot melt acrylic PSAs to increase thermal stability during processing.

Plasticizers: Optionally, low levels of plasticizer (e.g., less than about 10 parts by weight) may be combined with tackifier to adjust the Tg in order to optimize the peel and the low temperature performance of the adhesive. Plasticizers that may be added to the adhesive of the invention may be selected from a wide variety of commercially available materials. In each case, the added plasticizer must be compatible with the tackified acrylic PSA used in the formulation. Representative plasticizers include polyoxyethylene aryl ether, dialkyl adipate, 2-ethylhexyl diphenyl phosphate, t-butylphenyl diphenyl phosphate, di(2-ethylhexyl) adipate, toluenesulfonamide, dipropylene glycol dibenzoate, polyethylene glycol dibenzoate, polyoxypropylene aryl ether, dibutoxyethoxyethyl formal, and dibutoxyethoxyethyl adipate.

Various polymeric film substrates comprised of various thermosetting or thermoplastic polymers are suitable for use as the overlay. The structured layer, or referred to as the body layer, may be a single layer or multi-layer film. Illustrative examples of polymers that may be employed as the body layer film or overlay for flexible retroreflective articles include (1) fluorinated polymers such as poly(chlorotrifluoroethylene), poly(tetrafluoroethylene-co-hexafluoropropylene), poly(tetrafluoroethylene-co-perfluoro(alkyl) vinylether), poly(vinylidene fluoride-co-hexafluoropropylene); (2) ionomeric ethylene copolymers poly(ethylene-co-methacrylic acid) with sodium or zinc ions such as SURLYN-8920 Brand and SURLYN-9910 Brand available from E.I. duPont Nemours, Wilmington, Del.; (3) low density polyethylenes such as low density polyethylene; linear low density polyethylene; and very low density polyethylene; plasticized vinyl halide polymers such as plasticized poly(vinychloride); (4) polyethylene copolymers including acid functional polymers such as poly(ethylene-co-acrylic acid) "EAA", poly(ethylene-co-methacrylic acid) "EMA", poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or CH3 (CH2)n- where n is 0 to 12, and poly(ethylene-co-vinylacetate) "EVA"; and (5) (e.g.) aliphatic polyurethanes. The body layer is preferably an olefinic polymeric material, typically comprising at least 50 wt-% of an alkylene having 2 to 8 carbon atoms with ethylene and propylene being most commonly employed. Other body layers include for example poly(ethylene naphthalate), polycarbonate, poly (meth)acrylate (e.g., polymethyl methacrylate or "PMMA"), polyolefins (e.g., polypropylene or "PP"), polyesters (e.g., polyethylene terephthalate or "PET"), polyamides, polyimides, phenolic resins, cellulose diacetate, cellulose triacetate, polystyrene, styrene-acrylonitrile copolymers, cyclic olefin copolymers, epoxies, and the like. In some embodiments, the overlay is formed from a coating composition including one of the suitable polymers cast onto the structured layer and subsequently cured or dried. In other embodiments, the overlay includes multiple layers.

Exemplary liners for protecting the exposed adhesive surfaces for use in the light directing articles of the present disclosure include silicone coated materials such as papers and polymeric films, including plastics. The liner base material may be single or multiple layer. Specific examples include, polyester (for example polyethylene terephthalate), polyethylene, polypropylene (including cast and biaxially oriented polypropylene), and papers (including clay coated paper, polyethylene coated paper or a polyethylene coated poly(ethylene terephthalate) film.

In some embodiments, such as in retroreflective article 100, cube corner elements 112 are in the form of a tetrahedron or a pyramid. The dihedral angle between any two facets may vary depending on the properties desired in an application. In some embodiments (including the one shown in FIGS. 1A and 1B), the dihedral angle between any two facets is 90 degrees. In such embodiments, the facets are substantially perpendicular to one another (as in the corner of a room) and the optical element may be referred to as a cube corner. Alternatively, the dihedral angle between adjacent facets can deviate from 90° as described, for example, in U.S. Pat. No. 4,775,219, the disclosure of which is incorporated in its entirety herein by reference. Alternatively, the optical elements in the retroreflective article can be truncated cube corners. The optical elements can be full cubes, truncated cubes, or preferred geometry (PG) cubes as described in, for example, U.S. Pat. No. 7,422,334, the disclosure of which is incorporated in its entirety herein by reference.

For the structured layer 100 of FIGS. 1A and 1B is shown as including overlay layer 118 and no land layer or land portion. A land layer may be defined as continuous layer of material coextensive with the microstructured elements 112 and composed of the same material. This construction may be desirable for flexible embodiments. Those of skill in the art will appreciate that structured layer 110 can include a land layer or land portion.

As is schematically shown in FIG. 2, one method of making at least some of the light directing articles 100 of the present disclosure involves placing barrier elements 134 onto a pressure sensitive adhesive material 132 and then laminating the resulting pressure sensitive adhesive layer 130 to a structured layer 110. The pressure sensitive adhesive layer 130 can be formed in a variety of ways including but not limited to the following exemplary methods. In one exemplary embodiment, the material(s) forming the barrier elements are printed onto the pressure sensitive adhesive. The method of printing can be, a non-contact method such as, for example, printing using an inkjet printer. The method of printing can be a contact printing method such as, for example, flexographic printing. In another exemplary embodiment, the material(s) forming the barrier elements are printed onto a flat release surface using, for example, an inkjet or screen printing method, and are then subsequently transferred from the flat release surface onto the pressure sensitive adhesive. In another exemplary embodiment, the material(s) forming the barrier elements are flood coated onto a microstructured adhesive surface (e.g., a Comply liner manufactured by 3M Company of St. Paul, Minn.). The barrier elements are subsequently transferred from the microstructured liner to the pressure sensitive adhesive by, for example, lamination. The light directing article may then, optionally, be adhesively bonded to a substrate (e.g., a window pane or an aluminum substrate) to form, for example, covered window or a license plate or sign.

FIG. 5 shows an alternative exemplary light directing article 100 where the adhesive sealing layer 130 is a structured adhesive. Structured adhesive sealing layer 130 includes raised areas (a region that is raised relative to a surrounding region) of adhesive in a closed pattern, such as, for example, a hexagonal array. Barrier element 134 is included in the bottom of the well formed by the structured adhesive sealing layer 130.

Structured adhesive sealing layer 130 includes structured adhesive liner 140 and exposed adhesive layer 150. Structured adhesive sealing layer 130, when bonded to structured layer 110, defines low refractive index layers 138 that permit the portions of structured surface 114 adjacent to low refractive index layers 138 to direct incident light 150. As such, portions with that include microstructured elements 112 adjacent to low refractive index layers 138 are optically active. In contrast, portions with the structured adhesive layer 130 adjacent to microstructured elements 312 are optically inactive areas. Structured adhesive sealing layer 130 holds the entire construction together, thereby eliminating the need for a separate sealing layer and sealing process.

In some embodiments the adhesive sealing layer 130 includes at least one of, for example, a thermoplastic polymer, a cross-linkable material, and a radiation curable material. In some embodiments the adhesive sealing layer 130 comprises an adhesive, such as, for example, a heat activated adhesive, and/or a pressure sensitive adhesive or other material that can be formed using replication, heat embossing, extrusion replication, or the like. These constructions are characterized by having an embossed, replicated, or a similarly formed adhesive sealing layer 130 laminated to the back of the structured layer 110.

The structured adhesive sealing layer 130 can be formed in several different ways. The structured adhesive layer can include, for example, multiple layers formed at the same time or can be built through repeated coating steps. One exemplary method starts with a flat film of adhesive, optionally on a carrier web. The adhesive is nipped between a flat roll and a roll with the required relief pattern. With the addition of temperature and pressure, the relief pattern is transferred to the adhesive. A second exemplary method requires a castable or extrudable adhesive material. A film of the adhesive is created by extruding the material onto a roll with the required relief pattern. When the adhesive material is removed from the roll, it retains the relief pattern associated with the roll. The structured adhesive layer is then laminated to the retroreflective layer.

The structured adhesive sealing layer 130 is then bonded to the structured layer 110 by nipping the two films together in a nip consisting of two flat rolls. With the addition of temperature and pressure, the films adhesively bond, creating pockets of air that form the low refractive index region.

The structured adhesive layers can include, for example, a thermoplastic polymer, a heat-activated adhesive, such as, for example, an acid/acrylate or anhydride/acrylate modified EVA's such as, for example, Bynel 3101, such as described in, for example, U.S. Pat. No. 7,611,251, the entirety of which is herein incorporated by reference. The structured adhesive layers can include, for example, an acrylic PSA, or any other embossable material with adhesive characteristics that will adhere to the corner cube elements. The interface between the seal film layer and the (e.g., cube-corner) microstructured layer typically include an adhesion promoting surface treatment. Various adhesion promoting surface treatments are known and include for example, mechanical roughening, chemical treatment, (air or inert gas such as nitrogen) corona treatment (such as described in US2006/0003178A1), plasma treatment, flame treatment, and actinic radiation.

In one embodiment, the light directing article 100 is a retroreflective article. The coefficient of retroreflection $R_A$, can be modified depending on the properties desired in an application. In some embodiments, $R_A$ meets the ASTM D4956-07e1 standards at 0 degree and 90 degree orientation angles. In some embodiments, $R_A$ is in a range from about 5 cd/(lux·m$^2$) to about 1500 cd/(lux·m$^2$) when measured at 0.2 degree observation angle and +5 degree entrance angle according to ASTM E-810 test method or CIE 54.2; 2001 test method. In some embodiments, such as in embodiments where the retroreflective article is used in a traffic control sign, a delineator, or a barricade, $R_A$ is at least about 330 cd/(lux·m$^2$), or at least about 500 cd/(lux·m$^2$), or at least about 700 cd/(lux·m$^2$) as measured according to ASTM E-810 test method or CIE 54.2; 2001 test method at 0.2 degree observation angle and +5 degree entrance angle. In some embodiments, such as in motor vehicle related applications, $R_A$ is at least about 60 cd/(lux·m$^2$), or at least about 80 cd/(lux·m$^2$), or at least about 100 cd/(lux·m$^2$) as measured according to ASTM E-810 test method or CIE 54.2; 2001 test method at 0.2 degree observation angle and +5 degree entrance angle.

Another way of measuring retroreflective performance involves measuring the fractional retroreflectance $R_T$, which is explained in detail in ASTM E808-01. Fractional retroreflectance is the fraction of unidirectional flux illuminating a retroreflector that is received at observation angles less than a designated maximum value, $\alpha_{max}$. Thus, $R_T$ represents the portion of light being returned within a prescribed maximum observation angle, $\alpha_{max}$. In a manner consistent with ASTM E808-01, $R_T$ can be calculated as follows:

$$R_T = \int_{\alpha=0}^{\alpha_{max}} \int_{\gamma=-\pi}^{\pi} \left(\frac{R_a}{\cos(\beta)}\right)(\alpha)\,d\gamma\,d\alpha,$$

where $\alpha$ is the observation angle (expressed in radians), $\gamma$ is the presentation angle (also expressed in radians), $\beta$ is the entrance angle, and $R_a$ is the conventional coefficient of retroreflection expressed in units of candelas per lux per square meter. For purposes of this application, $R_T$ refers to the fractional retroreflectance expressed as a decimal, and % $R_T$ refers to the fractional retroreflectance expressed as a percentage, i.e., % $R_T$=$R_T$×100%. In either case, the fractional retroreflectance is unitless. As a graphical aid in understanding the observation angularity of a retroreflective sheeting, fractional retroreflectance may be plotted as a function of maximum observation angle, $\alpha_{max}$. Such a plot is referred to herein as an $R_T$-$\alpha_{max}$ curve, or a % $R_T$-$\alpha_{max}$ curve.

Another useful parameter for characterizing retroreflection is $R_T$ Slope, which can be defined as the change in $R_T$ for a small change or increment in the maximum observation angle, $\Delta\alpha_{max}$. A related parameter, % $R_T$ Slope, can be defined as the change in % $R_T$ for a small change in maximum observation angle, $\Delta\alpha_{max}$. Thus, $R_T$ Slope (or % $R_T$ Slope) represents the slope or rate of change of the $R_T$-$\alpha_{max}$ curve (or % $R_T$-$\alpha_{max}$ curve). For discrete data points these quantities may be estimated by calculating the difference in $R_T$ (or % $R_T$) for two different maximum observation angles $\alpha_{max}$, and dividing that difference by the increment in maximum observation angle, $\Delta\alpha_{max}$, expressed in radians. When $\Delta\alpha_{max}$ is expressed in radians, $R_T$ Slope (or % $R_T$ Slope) is the rate of change per radian. Alternatively and as used herein, when $\Delta\alpha_{max}$ is expressed in degrees, $R_T$ Slope (or % $R_T$ Slope) is the rate of change per degree in observation angle.

The equation given above for $R_T$ involves integrating the coefficient of retroreflection $R_A$ and other factors over all presentation angles ($\gamma$=$-\pi$ to $+\pi$) and over a range of observation angles ($\alpha$=0 to $\alpha_{max}$). When dealing with discrete data points this integration can be performed using $R_A$ measured at discrete observation angle $\alpha_{max}$ values (0.1 degrees) separated by increments $\Delta\alpha_{max}$.

In at least some embodiments of the present disclosure, the structured surface exhibits a total light return that is not less than about 5%, not less than 8%, not less than 10%, not less than 12%, not less 15% for incident visible light at an entrance angle of −4 degrees. In at least some of the embodiments of the present disclosure, the structured surface of the retroreflective article exhibits a coefficient of retroreflection $R_A$ that is not less than about 40 cd/(lux·m2), not less than 50 cd/(lux·m2), not less than 60 cd/(lux·m2), not less than 70 cd/(lux·m2), and not less than 80 cd/(lux·m2) for an observation angle of 0.2 degrees and an entrance angle of −4 degrees.

With appropriate choice of barrier elements 134, size, structure, and/or spacing, the retroreflective articles of the present disclosure have a more uniform appearance than can be attained with conventional retroreflective articles including a sealing layer. Additionally, the retroreflective articles of the present disclosure do not require the inclusion or use of a sealing layer, reducing their cost.

Microsealed prismatic sheeting is especially suitable in applications such as license plates and graphics. The prismatic sheeting provides benefits such as significantly lower manufacturing cost, reduced cycle time, and elimination of wastes including especially solvents and $CO_2$ when replacing glass bead sheeting. Furthermore, prismatic constructions return significantly increased light when compared to glass bead retroreflectors. Proper design also allows this light to be preferentially placed at the observation angles of particular importance to license plates, e.g., the range 1.0 to 4.0 degrees. Finally, micro sealed sheeting provides the brilliant whiteness and uniform appearance at close viewing distances needed in these product applications.

Exemplary retroreflective articles include, for example, retroreflective sheeting, retroreflective signage (including, for example, traffic control signs, street signs, highway signs, roadway signs, and the like), license plates, delineators, barricades, personal safety products, graphic sheeting, safety vest, vehicle graphics, and display signage.

The following examples describe some exemplary constructions of various embodiments of the retroreflective articles and methods of making the retroreflective articles described in the present disclosure. The following examples are intended to be illustrative, but are not intended to limit the scope of the present disclosure.

Although specific embodiments have been shown and described herein, it is understood that these embodiments are merely illustrative of the many possible specific arrangements that can be devised. Numerous and varied other arrangements can be devised in accordance with these principles by those of skill in the art without departing from the spirit and scope of the invention. Thus, the scope of the present invention should not be limited to the structures described in this application, but only by the structures described by the language of the claims and the equivalents of those structures.

EXAMPLES

Test Methods:
Nanoindentation:
a) Sample Preparation:

Samples of light directing articles were provided. The light directing articles comprised a structured layer having a first side (i.e., front side) and an opposite second side (i.e., back side), an optional top layer adjacent the first side of the structured layer, and an adhesive sealing layer adjacent the second side of the structured layer. The adhesive sealing layer further included an adhesive layer and barrier elements disposed thereon, wherein the barrier elements comprised a crosslinked polymeric matrix. The samples were prepared for testing by first separating the structured layer and top layer from the adhesive sealing layer by attaching an adhesive tape to the adhesive sealing layer, dipping the construction in liquid nitrogen and pulling the construction apart. This resulted in a separation of the adhesive sealing layer from the structured surface and top layer, and exposure of the barrier elements. The adhesive sealing layer comprising barrier elements was then embedded in an epoxy adhesive (available under the trade designation Struers SpeciFix Resin mixed with a curing agent Struers SpeciFix-20 at a ratio of 7:1 by weight), cured for 24 hours and subsequently cryomicrotomed at a temperature of −20° C. using a LEICA EM UC6 from Leica Mycrosystems of Illinois, USA. The resulting multilayer construction comprised adhesive tape/adhesive layer/barrier elements/epoxy layer. Next, the multilayer construction was sectioned, exposing its cross-section.

b) Modulus of Elasticity Measurement:

modulus of elasticity of barrier elements was measured using nanoindentation. A nanoindenter model G200 (from Keysight technologies) coupled to a DCM II transducer (from Keysight Technologies, Santa Rosa, Calif.), and a Berkovich diamond tip (commercially available from Microstar Technologies, Huntsville, Tex.) were used. Indenter calibrations were performed on a fused silica standard prior to each test to verify integrity of tip area function. All tests were conducted such that surface contact criteria was greater than 50 N/m at approach velocity of 40 nm/s. Load, displacement, and harmonic contact stiffness were obtained after contact using constant strain rate of 0.05 $s^{-1}$ and command depth of 300 nm. Maximum drift setpoint was set at 0.5 nm/s. Modulus and hardness were determined at depths from 30 nm to 200 nm. Elastic modulus was obtained using equations (1) and (2), $$E_r = \frac{\sqrt{\pi}}{2} \frac{S}{\sqrt{A}} \tag{1}$$

$$E = (1-v^2)\left[\frac{1}{E_r} - \frac{1-v_i^2}{E_i}\right]^{-1} \tag{2}$$

wherein $E_r$ corresponded to reduced modulus [N/m²] or [GPa] measured directly by the instrument during experiment; S corresponded to contact stiffness [N/m]; $v_i$ corresponded to Poisson's ratio of sample material; $E_i$ corresponded to the elastic modulus of diamond; and E corresponded to the elastic modulus of the sample material Contact stiffness S, was measured by a technique in which a harmonic wave is superimposed over the DC signal that drives motion of the indenter, so that contact stiffness is measured continuously during loading using a harmonic frequency of 75 Hz, with 1 nanometer amplitude. Values for Elastic Modulus and Poisson ratio of a diamond were taken as 1141 GPa and 0.07 respectively.

Hardness (Newton/meter²) was determined by dividing the maximum load (Newton) (Pmax) by contact area (square meter) ($A_c$) at a strain rate of 0.05 $sec^{-1}$. Contact area was determined via the calibration tests in which contact area (tip area function) was found as a function of penetration depth.

Materials

| Trade Designation/ Abbreviation | Description | Supplier |
|---|---|---|
| AA | Acrylic Acid | |
| BLANKOPHOR Dye | Dye | StarChem, South Carolina, USA |
| CD 612 | Ethyoxylated(4) nonyl phenol methacrylate | Sartomer Americas (Exton, PA) |
| CN 2285 | Acrylic Oligomer | Sartomer Americas |
| CN 929 | Trifunctional acrylate | Sartomer Americas |
| CN 991 | Aliphatic polyester urethane difunctional acrylate | Sartomer Americas |
| EBECRYL 8301R (E8301R) | Hexafunctional urethane acrylate | Allnex USA Inc. (Alpharetta, GA) |

-continued

| Trade Designation/ Abbreviation | Description | Supplier |
|---|---|---|
| FORAL 85 | Tackifier, ester of hydrogenated rosin | Eastman, Kingsport, TN |
| HDDA:PETA | 1:1 Mixture of 1,6-hexanediol diacrylate and pentaerythritol tetraacrylate | Sartomer Americas |
| IOA | Isooctyl acrylate | |
| IOTG | Isooctylthioglycolate, chain transfer agent | Evans Chemetics, Waterloo, NY |
| IRGACURE 651 | Photoinitiator | BASF, Florham Park, NJ |
| IRGANOX 1076 | Sterically hindered phenolic antioxidant | BASF |
| PL-100 | PL-100 is a 70:30 blend of oligo [2-hydroxy-2-methyl-1-[4-(1-methylvinyl) phenyl]propanone] and 2-Hydroxy-2 methyl-1-phenyl-1-propanone | Esstech, Inc. (Essington, PA) |
| SR 420 | 3,3,5-trimethylcyclohexyl acrylate | Sartomer Americas |
| SR 217 | Cycloaliphatic acrylate monomer | Sartomer Americas |
| SR 506D | Isobornyl Acrylate | Sartomer Americas |
| $TiO_2$ | Titanium dioxide | E.I. du Pont de Nemours and Company, Wellington, DE |
| VAZO 64 | 2,2'azobis-(2-isobutyronitrile), polymerization initiator | E.I. du Pont |
| G7758-MS-6-10 | Alkyd resin | OPC Polymers, Columbus, OH |
| BIS | Bisamide crosslinker | |

Examples

COMPARATIVE EXAMPLE A AND EXAMPLES 1-6

Light directing articles comprising a structured layer including multiple microstructured elements were prepared as generally described in U.S. Pat. No. 8,371,703 (Smith et al), the disclosure of which is incorporated herein by reference in its entirety. A master tool was prepared by cutting three grooves onto a machinable metal using a high precision diamond tool (such as "K&Y Diamond," manufactured and sold by Mooers of New York, U.S.A) to form microprisms. The tool comprised a 4.0 mil primary groove pitch and isosceles base triangles having base angles of 58 degrees.

The master tool was removed from the groove-forming machine. A first generation negative tooling was made from the master by nickel electroforming the master in a nickel sulfamate bath as generally described in U.S. Pat. No. 4,478,769 (Pricone) and U.S. Pat. No. 5,156,863 (Pricone), both of which are incorporated herein by reference in their entirety. Multiple second generation negative tools containing microcube prism recesses were subsequently turned into an endless belt 20 feet (6.1 m) in length in the downweb direction and 3 feet (0.92 m) in the crossweb direction, as generally described in U.S. Pat. No. 7,410,604 (Erickson), the disclosure of which is incorporated herein by reference in its entirety.

A polycarbonate resin (such as commercially available under the trade designation "MAKROLON 2407" by Mobay Corporation, Pennsylvania, U.S.A.) was cast at a temperature of 550° F. (287.8° C.) onto the endless belt, which was heated to 420° F. (215.6° C.). Coincident with filling the microcube recesses, additional polycarbonate was deposited in a continuous land layer above the endless belt with a thickness of approximately 102 micrometer (0.004 inch). The polycarbonate was then cooled with room temperature air, allowing the material to solidify and resulting in a microstructured layer. The microstructured layer was subsequently removed from the belt.

A radiation-polymerizable pressure sensitive adhesive (PSA) was prepared as described in U.S. Pat. No. 5,804,610 (Hamer), incorporated herein by reference. The PSA composition was made by mixing 95 parts by weight isooctyl acrylate (IOA), 5 parts by weight acrylic acid (AA), 0.1 parts by weight of IRGACURE 651, 0.02 parts by weight of isooctylthioglycolate (IOTG), and 0.4 parts by weight of IRGANOX 1076. The PSA composition was placed into packages made of an ethylene vinyl acetate copolymer film of 0.0635 mm thickness (commercially available under the trade designation "VA-24" from Pliant Corporation, Dallas, Tex.) measuring approximately 10 centimeters by 5 centimeters and heat sealed. The PSA composition was then polymerized. After polymerization, the PSA composition was compounded in a twin screw extruder with 50 wt % FORAL 85 tackifier and 18 wt % of a mixture of $TiO_2$/EVA pigment and cast as a film onto a silicone coated release liner at a thickness of about 15 grains per 4 in by 6 in sample as generally described in U.S. Pat. No. 5,804,610. The PSA film was then subjected to a radiation crosslinking step.

Barrier compositions were prepared by mixing the ingredients listed in Table 1, below, in the order provided. Mixing was conducted at room temperature and using a magnetic plate and stir bar for up to 12 hours to ensure adequate homogenization. In some embodiments, the mixture was heated to a temperature of about 60° C. to ensure adequate homogenization. The amount of each ingredient is shown as weight percent (wt %) based on the total weight of the composition. Average functionality of each barrier composition was calculated as weighted average of the functionality of each ingredient in the composition. Modulus of elasticity and hardness were calculated according to the procedure described above and expressed as average of multiple replicates. Functionality, modulus of elasticity and hardness are also reported in Table 1.

TABLE 1

| Ingredients | Comp. Barrier Comp. A (wt %) | Barrier Comp. 1 (wt %) | Barrier Comp. 2 (wt %) | Barrier Comp. 3 (wt %) | Barrier Comp. 4 (wt %) | Barrier Comp. 5 (wt %) | Barrier Comp. 6 (wt %) |
|---|---|---|---|---|---|---|---|
| E8301R | 49.5 | 0 | 0 | 20 | 40 | 34.7 | 45 |
| HDDA:PETA | 49.5 | 0 | 0 | 0 | 0 | 34.6 | 30 |
| CN 420 | 0 | 39.6 | 0 | 0 | 14 | 0 | 0 |
| CN 929 | 0 | 0 | 0 | 22 | 20 | 0 | 14 |
| CN 991 | 0 | 59.4 | 26.3 | 0 | 0 | 29.7 | 0 |
| CN 2285 | 0 | 0 | 65.7 | 25 | 0 | 0 | 0 |
| CD 612 | 0 | 0 | 0 | 0 | 0 | 0 | 0 |
| SR 217 | 0 | 0 | 0 | 32 | 25 | 0 | 10 |
| SR 506D | 0 | 0 | 6.6 | 0 | 0 | 0 | 0 |
| PL 100 | 1 | 1 | 1.3 | 1 | 1 | 1 | 1 |
| Blankophor Dye | 0.1 | 0 | 0.1 | 0 | 0 | 0 | 0 |
| Functionality | 4.46 | 1.6 | 1.91 | 2.68 | 3.39 | 3.7 | 4.12 |
| Modulus of Elasticity (GPa) | 4.8 | 0.91 | 2.6 | 3 | 3.2 | 3.59 | 4.2 |
| Hardness (MPa) | 370 | 8 | 90 | 170 | 220 | 263 | 320 |

Barrier elements of Comparative Example A and Examples 1-6 were prepared by selectively applying, respectively, Barrier Composition A and Barrier Compositions 1-6 onto the PSA film. The barrier elements were printed at a printing speed of 20 fpm using a flexographic printer comprising a printing plate made with 0.067 Cyrel DPR, commercially available from SGS Corporation. The plate was designed to print squares arranged in a grid pattern, wherein each square was 400 by 400 microns. Pitch (distance between the centers of each adjacent square) was 730 microns. The distance between each square (width) was 330 microns. Theoretical area coverage (% area) was calculated to be about $(400/(400+330))^2 = 30\%$. The barrier elements were subsequently cured using UV H bulbs.

Light directing articles of Comparative Example A and Examples 1-6 were prepared by laminating the printed PSA films to the structured side of microstructured layers, prepared as described above.

Retroreflectivity (RA) was measured using a retroreflectometer (model RetroSign GR3, available from Delta Danish Electronics, Light & Acoustics, Denmark) at observation angles of 0.2, 0.5 and 1.0 degrees, entrance angle of −4 degrees, and orientation of 0 deg. Results are reported in cd/lux·m² as an average of four individual readings in Table 2, below.

TABLE 2

| | Retroreflectivity (cd/lux · m²) | | |
|---|---|---|---|
| Examples | Observation Angle 0.2 | Observation Angle 0.5 | Observation Angle 1.0 |
| Comp. Ex. A | 56 | 47 | 32 |
| Example 1 | 79 | 49 | 30 |
| Example 2 | 56 | 37 | 23 |
| Example 3 | 65 | 53 | 35 |
| Example 4 | 88 | 53 | 31 |
| Example 5 | 75 | 46 | 27 |
| Example 6 | 80 | 49 | 30 |

The light directing articles were subjected to additional pressure using a platen press at either room temperature (25° C.) or heated to a temperature of about 49° C. (120° F.), using a pressure of either about 5000 lbs (2268 kg) or about 15000 lbs (6804 kg), a compression area of about 1⅜ in by 1⅞ in or about 2.6 in² (about 17 cm²) and a dwell time of 15 sec. Initial reflectivity at an observation angle of 0.2 (R1), final reflectivity (after the platen press treatment) at an observation angle of 0.2 (R2), and retention (Rt)((R2/R1)*100) were measured and/or calculated. Results obtained with the platen press heated to 25° C. are reported in Table 3, below. Results obtained with the platen press heated to about 49° C. are reported in Table 4, below.

TABLE 3

| | Room temperature, 5000 lbs | | | Room temperature, 15000 lbs | | |
|---|---|---|---|---|---|---|
| Examples | R1 (cd · lux · m²) | R2 (cd · lux · m²) | Rt (%) | R1 (cd · lux · m²) | R2 (cd · lux · m²) | Rt (%) |
| Comp. Example A | 59 | 14 | 24 | 55 | 8 | 15 |
| Example 1 | 82 | 74 | 90 | 75 | 71 | 95 |
| Example 2 | 58 | 49 | 84 | 46 | 36 | 78 |
| Example 3 | 65 | 51 | 78 | 67 | 48 | 72 |
| Example 4 | 82 | 54 | 66 | 89 | 54 | 61 |
| Example 5 | 71 | 28 | 39 | 82 | 24 | 29 |
| Example 6 | 84 | 38 | 45 | 78 | 22 | 28 |

TABLE 4

| | 49° C., 5000 lbs | | | 49° C., 15000 lbs | | |
|---|---|---|---|---|---|---|
| Examples | R1 (cd · lux · m²) | R2 (cd · lux · m²) | Rt (%) | R1 (cd · lux · m²) | R2 (cd · lux · m²) | Rt (%) |
| Comparative Example A | 54 | 6 | 11 | 56 | 5 | 9 |
| Example 1 | 82 | 70 | 85 | 78 | 65 | 83 |
| Example 2 | 51 | 44 | 86 | 67 | 53 | 79 |
| Example 3 | 65 | 43 | 66 | 63 | 47 | 75 |
| Example 4 | 85 | 45 | 53 | 96 | 47 | 49 |
| Example 5 | 66 | 16 | 24 | 81 | 15 | 19 |
| Example 6 | 82 | 25 | 30 | 75 | 12 | 16 |

What is claimed is:

1. A light directing article, comprising:
    a structured layer comprising multiple microstructured elements that is opposite a major surface;
    an adhesive sealing layer having a first region and a second region wherein the second region is in contact with the structured layer; and
    a plurality of barrier elements;
    wherein at least one barrier element is in direct contact with both the first region of the adhesive sealing layer and the structured layer;
    wherein the first region with the barrier element and second region have sufficiently different properties to form a low refractive index layer between the adhesive sealing layer and the structured layer;
    wherein each barrier element comprises a crosslinked polymeric matrix having a modulus of elasticity less than 4.4 GPa and greater than 0.5 GPa.

2. The light directing article of claim 1, where in the hardness of the crosslinked polymeric matrix is less than 370 MPa.

3. The light directing article of claim 1, where in the hardness of the crosslinked polymeric matrix is greater than 5 MPa.

4. The light directing article of claim 1, wherein the barrier element comprises a crosslinked polymeric matrix having a thickness greater than 1.6 microns.

5. The light directing article of claim 1, wherein the barrier element comprises a crosslinked acrylate polymeric matrix.

6. The light directing article of claim 5, wherein the crosslinked acrylate polymeric matrix is one of a urethane acrylate, acrylic acrylate, epoxy acrylate, or polyester acrylate.

7. The light directing article of claim 1, wherein the barrier element comprises the reaction product of:
    an acrylate polymer with at least two acrylate groups;
    a photoinitiator;
    wherein the reaction product mixture has a viscosity of greater than 100 and less than 2000 cPS.

8. The light directing article of claim 1, wherein the barrier element comprises the reaction product of:
    an acrylate polymer with at least two acrylate groups;
    a diluent;
    a photoinitiator;
    wherein the reaction product mixture has a viscosity of greater than 300 and less than 1500 cPS.

9. The light directing article of claim 1, wherein the adhesive sealing layer comprises a pressure sensitive adhesive that is in intimate contact with the microstructured elements of the structured layer.

10. The light directing article of claim 1, wherein the adhesive sealing layer comprises a structural adhesive with legs and a base forming a well, wherein the legs of the structured adhesive are in intimate contact with the microstructured elements of the structured layer and at least one barrier element is in the well.

11. The light directing article of claim 1, wherein the adhesive sealing layer is transparent.

12. The light directing article of claim 1, wherein the adhesive sealing layer is opaque.

13. The light directing article of claim 1, wherein the first region is surrounded by the second region.

14. The light directing article of claim 1, wherein the barrier element has sufficient structural integrity to substantially prevent flow of the pressure sensitive adhesive into the low refractive index layer.

15. The light directing article of claim 1, including multiple optically active areas and multiple optically inactive areas and at least some of the optically inactive areas and optically active areas form a pattern.

16. A method of making the light directing article of claim 1.

* * * * *